US012810172B2

(12) United States Patent
Zoph et al.

(10) Patent No.: US 12,810,172 B2
(45) **Date of Patent: *Nov. 24, 2026**

(54) NEURAL ARCHITECTURE SEARCH

(71) Applicant: Google LLC, Mountain View, CA (US)

(72) Inventors: Barret Zoph, Sunnyvale, CA (US); Quoc V. Le, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 646 days.

This patent is subject to a terminal disclaimer.

(21) Appl. No.: 18/226,527

(22) Filed: Jul. 26, 2023

(65) Prior Publication Data

US 2023/0368024 A1 Nov. 16, 2023

Related U.S. Application Data

(63) Continuation of application No. 17/340,959, filed on Jun. 7, 2021, now Pat. No. 11,829,874, which is a (Continued)

(51) Int. Cl.
*G06F 21/00* (2013.01)
*G06F 18/21* (2023.01)
(Continued)

(52) U.S. Cl.
CPC ......... *G06N 3/0985* (2023.01); *G06F 18/217* (2023.01); *G06N 3/044* (2023.01)

(58) Field of Classification Search
None
See application file for complete search history.

(56) References Cited

U.S. PATENT DOCUMENTS

| | | | |
|---|---|---|---|
| 6,553,357 | B2 | 4/2003 | Mathias et al. |
| 2016/0224903 | A1 | 8/2016 | Talathi et al. |

FOREIGN PATENT DOCUMENTS

| | | |
|---|---|---|
| CN | 102402712 | 3/2014 |
| JP | 2003-508835 | 3/2003 |

(Continued)

OTHER PUBLICATIONS

Andreas ("Learning to Compose Neural Networks for Question Answering", https://arxiv.org/pdf/1601.01705v3.pdf, arXiv: 1601.01605v4 [cs.CL] Jun. 7, 2016, pp. 1-10) (Year: 2016) (Year: 2016).*

(Continued)

*Primary Examiner* — Andrew J Steinle
(74) *Attorney, Agent, or Firm* — Fish & Richardson P.C.

(57) ABSTRACT

Methods, systems, and apparatus, including computer programs encoded on computer storage media, for determining neural network architectures. One of the methods includes generating, using a controller neural network, a batch of output sequences, each output sequence in the batch defining a respective architecture of a child neural network that is configured to perform a particular neural network task; for each output sequence in the batch: training a respective instance of the child neural network having the architecture defined by the output sequence; evaluating a performance of the trained instance of the child neural network on the particular neural network task to determine a performance metric for the trained instance of the child neural network on the particular neural network task; and using the performance metrics for the trained instances of the child neural network to adjust the current values of the controller parameters of the controller neural network.

20 Claims, 5 Drawing Sheets

Related U.S. Application Data continuation of application No. 16/397,641, filed on Apr. 29, 2019, now Pat. No. 11,030,523, which is a continuation of application No. PCT/US2017/058760, filed on Oct. 27, 2017.

(60) Provisional application No. 62/414,300, filed on Oct. 28, 2016.

(51) Int. Cl.
*G06N 3/044* (2023.01)
*G06N 3/0985* (2023.01)

(56) References Cited

FOREIGN PATENT DOCUMENTS

| | | |
|---|---|---|
| JP | 2017-102906 | 6/2017 |
| JP | 2019-522868 | 8/2019 |
| JP | 6817431 | 1/2021 |

OTHER PUBLICATIONS

Young et al ("Optimizing Deep Learning Hyper-Parameters Through an Evolutionary Algorithm", MLH PC2015, Nov. 15-20, 2015, Austin, Tx, pp. 2-15) (Year: 2015) (Year: 2015).*
He et al. ("identity Mappings in Deep Residual Networks", https://arxiv.org/abs/1603.05027, arXiv:1603.05027v3 [cs.CV] Jul. 25, 2016, pp. 1-15 (Year: 2016) (Year: 2016).*
Jozefowicz et al ("An Empirical Exploration of Recurrent Network, Architectures", 32nd International Conference on Machine Learning, Lille France, Jul. 6-11, 2015, pp. 1-9) (Year: 2015) (Year: 2015).*
Andreas et al., "Learning to compose neural networks for question answering," CoRR, Submitted on Jun. 7, 2016, arXiv:1601.01705v4, 10 pages.
Andrychowicz et al., "Learning to learn by gradient descent by gradient descent," CoRR, Submitted on Jun. 14, 2016, arXiv:1606.04474v1, 17 pages.
Bahdanau et al., "Neural machine translation by jointly learning to align and translate," International Conference on Learning Representations, May 2016, 15 pages.
Bengio et al., [online], "A neural probabilistic language model," Apr. 2013, retrieved on Jun. 4, 2019, retrieved from: URL<http://www.jmlr.org/papers/volume3/bengio03a/bengio03a.pdf>, 19 pages.
Bergstra et al., [online], "Making a science of model search: Hyperparameter optimization in hundreds of dimensions for vision architectures," 2013, retrieved on Jun. 4, 2019, retrieved from: URL <http://proceedings.mlr.press/v28/bergstra13.pdf>, 9 pages.
Bergstra et al., [online], "Random search for hyper-parameter optimization," Apr. 2012, retrieved on Jun. 4, 2019, retrieved from: URL<http://www.jmlr.org/papers/volume13/bergstra12a/bergstra12a.pdf>, 25 pages.
Bosc et al., "Learning to learn neural networks," CoRR, Submitted on Oct. 19, 2016, arXiv:1610.06072v1, 4 pages.
Cheng et al., [online], "Language modeling with sum-product networks," Jan. 2014, retrieved Jun. 4, 2019, retrieved from: URL<https://www.comp.nus.edu.sg/~skok/papers/is14.pdf>, 5 pages.
Dean et al., "Large scale distributed deep networks," NeurIPS Proceedings, 2012, 9 pages.
Diederik et al., "Adam: A method for stochastic optimization," International Conference for Learning Representations, Jan. 2017, 15 pages.
Fcrnando ct al., "Convolution by Evolution," CoRR, Submitted on Jun. 8, 2016, arXiv:1606.02580v1, 8 pages.
Gal et al., "A theoretically grounded application of dropout in recurrent neural networks," Advances in Neural Information Processing Systems, Oct. 2016, 14 pages.
Ha et al., "Hypernetworks," Machine Learning, Dec. 2016, 29 pages.
He et al., "Deep residual learning for image recognition," Proceedings of the IEEE Conference on Computer Vision and Pattern Recognition, Dec. 2015, 12 pages.
He et al., "Identity mappings in deep residual networks," European Conference on Computer Vision, Jul. 2016, 15 pages.
Hochreiter et al., [online], "Long short-term memory," Dec. 1997, retrieved on Jun. 4, 2019, retrieved from: URL <https://www.researchgate.net/profile/Sepp_Hochreiter/publication/13853244_Long_Short-term_Memory/links/5700e75608aea6b7746a0624/Long-Short-term-Memory.pdf?origin=publication_detail>, 32 pages.
https://infoscience.epfl.ch [online], "Neuroevolution: from architectures to learning," Oct. 2007, retrieved Jun. 4, 2019, retrieved from: URL <https://infoscience.epfl.ch/record/112676/files/FloreanoDuerrMattiussi2008.pdf>, 16 pages.
https://lear.inrialpes.fr [online], "Histograms of oriented gradients for human detection," Jun. 2005, retrieved Jun. 4, 2019, retrieved from: URL <https://lear.inrialpes.fr/people/triggs/pubs/Dalal-cvpr05.pdf>, 8 pages.
Huang et al., "Densely connected convolutional networks," Computer Vision and Pattern Recognition, Nov. 2016, 11 pages.
Inan et al., "Tying word vectors and word classifiers: A loss framework for language modeling," International Conference on Learning Representations, Mar. 2017, 13 pages.
Jarrett et al., [online], "What is the best multi-stage architecture for object recognition?," 2009, retrieved Jun. 4, 2019, retrieved from: URL <http://yann.lecun.com/exdb/publis/pdf/jarrett-iccv-09.pdf>, 8 pages.
Jozefowicz et al., [online], "An empirical exploration of recurrent network architectures," 2015, retrieved: Jun. 4, 2019, retrieved from: URL <http://proceedings.mlr.press/v37/jozefowicz15.pdf>, 9 pages.
Kim et al., "Character-aware neural language models," CoRR, Submitted on Dec. 1, 2015, arXiv:1508.06615v4, 9 pages.
Krizhcvsky ct al., [onlinc], "Imagcnct classification with dccp convolutional ncural networks," 2012, retrieved on Jun. 4, 2019, retrieved from URL<https://papers.nips.cc/paper/4824-imagenet-classification-with-deep-convolutional-neural-networks.pdf>, 9 pages.
Lake et al., [online], "Human-level concept learning through probabilistic program induction," Dec. 2015, retrieved Jun. 4, 2019, retrieved from URL <https://web.mit.edu/cocosci/Papers/Science-2015-Lake-1332-8.pdf> 8 pages.
Larsson et al., "Fractalnet: Ultra-deep neural networks without residuals," Computer Vision and Pattcrn Rccognition, May 2016, 9 pages.
LeCun et al., [online], "Gradient-based learning applied to document recognition," Nov. 1998, retrieved on Jun. 4, 2019, retrieved from URL <http://vision.stanford.edu/cs598_spring07/papers/Lecun98.pdf>, 46 page.
Lee et al., [online], "Deeply-supervised nets," 2015, retrieved on Jun. 4, 2019, retrieved from URL <http://procccdings.mlr.prcss/v38/lcc15a.pdf>, 9 pages.
Li et al., "Learning to Optimize," Department of Electrical Engineering and Computer Sciences University of California, Jun. 2016, 9 pages.
Liang et al., [online], "Learning programs: A hierarchical Bayesian approach," 2010 , retrieved Apr. 6, 2019, retrieved from: URL <https://people.eecs.berkeley.edu/~jordan/papers/liang-jordan-klein-icml10.pdf>, 8 pages.
Lin et al., "Network in network," Neural and Evolutionary Computing, Dec. 2013, 9 pages.
Lowe [online], "Object recognition from local scale-invariant features," Sep. 1999, retrieved on Jun. 4, 2019, retrieved from URL <http://citeseerx.ist.psu.edu/viewdoc/download?doi=10.1.1.586.504&rep=rep1&type=pdf>, 8 pages.
Mendoza et al., [online],"Towards automatically-tuned neural networks," 2016, retrieved on Jun. 4, 2019, retrieved from URL <https://ml.informatik.uni-freiburg.de/papers/16-AUTOML-AutoNet.pdf> 8 pages.
Merity et al., "Pointer sentinel mixture models," CoRR, Submitted on Sep. 26, 2016, arXiv:1609.07843v1, 13 pages.
Merity et al., [online], "Smerity.com: In deep learning, architecture engineering is the new feature engineering," Jun. 2016, retrieved

(56) References Cited

OTHER PUBLICATIONS

May 2019, retrieved from: URL<https://smerity.com/articles/2016/architectures_are_the_new_feature_engineering.html>, 7 pages.
Mikolov et al., [online], "Context dependent recurrent neural network language model," 2012, retrieved Jun. 4, 2019, retrieved from: URL <https://www.microsoft.com/en-us/research/wp- content/uploads/2016/02/rnn_ctxt.pdf>, 6 pages.
Mnih et al., [online], "Three new graphical models for statistical language modeling," 2007, retrieved on Jun. 4, 2019, retrieved from URL <https://www.cs.toronto.edu/~amnih/papers/threenew.pdf>, 8 pages.
Nair et al., [online], "Rectified linear units improve restricted Boltzmann machines,"2010, retrieved Jun. 4, 2019, retrieved from URL <http://citeseerx.ist.psu.edu/viewdoc/download?doi=10.1.1.165.6419&rep=rep1&type=pdf>, 8 pages.
Neelakantan et al., "Neural programmer: Inducing latent programs with gradient descent," CoRR, Submitted in Nov. 16, 2015, arXiv:1511.04834v1, 17 pages.
Notice of Allowance in Korean Appln. No. 10-2022-7011808, dated Feb. 20, 2023, 4 pages (with English Translation).
Office Action in Chinese Appln No. 201711037649.0, dated Mar. 1, 2021, 8 pages (with English translation).
Office Action in Chinese Appln No. 201711037649.00, dated Aug. 26, 2021, 14 pages (with English translation).
Office Action in German Appln. No. 10 2017 125 256.8, dated Feb. 28, 2023, 20 pages (with English Translation).
Office Action in Indian Appln. No. 201927010937, dated Apr. 5, 2021, 7 pages (with English translation).
Office Action in Japanese Appln. No. 2019-522868, dated Jul. 13, 2020, 9 pages (with English translation).
Office Action in Japanese Appln. No. 2020-215172, dated Dec. 13, 2021, 11 pages (with English translation).
Office Action in Korean Appln. No. 10-2022-7011808, dated Aug. 16, 2022, 6 pages (with English translation).
Pascanu et al., "How to construct deep recurrent neural networks," International Conference on Learning Representations, Dec. 2013, 10 pages.
International Search Report and Written Opinion in International Appln. No. PCT/US2017/058760, mailed on Feb. 21, 2018, 22 pages.
Press et al., "Using the output embedding to improve language models," International Conference on Learning Representations, Nov. 2016, 11 pages.
Ranzato et al., "Sequence level training with recurrent neural networks," International Conference on Learning Representations, Nov. 2015, 14 pages.
reddit.com [online],' "Why does everyone put a softmax or dense layer on the output of an lstm?," Sep. 2016, [retrieved May 15, 2019], retrieved from: URL<https://www.reddit.com/r/MachineLearning/comments/524nyw/why_does_everyone_put_a_softmax_or_dense_layer on/>, 4 pages.
Reed et al., "Neural programmer-interpreters," International Conference on Learning Representations, Dec. 2015, 12 pages.
Saxena et al., [online], "Convolutional neural fabrics," 2016, retrieved on Jun. 4, 2019, retrieved from URL <https://papers.nips.cc/paper/6304-convolutional-neural-fabrics.pdf> 9 pages.
Sergey et al., "Batch normalization: Accelerating deep network training by reducing internal covariate shift," CoRR, Submitted on Mar. 2, 2015, arXiv: 1502.03167v3, 11 pages.
Shen et al., [online], "Minimum risk training for neural machine translation," 2016, retrieved on Jun. 4, 2019, retrieved from URL <https://www.aclweb.org/anthology/P16-1159>, 10 pages.
Simonyan et al., "Very deep convolutional networks for large-scale image recognition," CoRR, Submitted on Dec. 19, 2015, arXiv:1409.1556v4, 13 pages.
Snoek et al., [online], "Practical Bayesian optimization of machine learning algorithms," 2012, retrieved on Jun. 4, 2019, retrieved from URL <https://papers.nips.cc/paper/4522-practical-bayesian-optimization-of-machine-learning-algorithms.pdf>, 9 pages.
Springenberg et al., "Striving for simplicity: The all convolutional net," CoRR, Submitted on Dec. 13, 2024, arXiv:1412.6806v3, 12 pages.
Srivastava et al., "Highway networks," CoRR, Submitted on Nov. 3, 2015, arXiv:1505.00387v2, 6 pages.
Stanley et al., [online], "A hypercube-based encoding for evolving large-scale neural networks," 2009, retrieved on Jun. 6, 2019, retrieved from URL <http://axon.cs.byu.edu/~dan/778/papers/NeuroEvolution/stanley3**.pdf>, 39 pages.
Sutskever et al., "Sequence to Sequence Learning with Neural Networks," CoRR, Submitted on Dec. 14, 2014, arXiv:1409.3215v3, 9 pages.
Sutskever et al., [online], "On the importance of initialization and momentum in deep learning," available on or before Jun. 2014, via internet archive: Wayback Machine URL<https://web.archive.org/web/20140603003105/https://www.cs.toronto.edu/~fritz/absps/momentum.pdf>, retrieved Jun. 4, 2019, URL <https://www.cs.toronto.edu/~fritz/absps/momentum.pdf>, 14 pages.
Szcgcdy ct al., "Going dccpcr with convolutions," Procccdings of the IEEE Confcrcncc on Computer Vision and Pattern Recognition, Sep. 2014, 12 pages.
towardsdatascience.com [online], "Neural Network Architectures," Mar. 2017, retrieved May 20, 2019, retrieved from: URL<https://towardsdatascience.com/neural-network-architectures-156e5bad51ba>, 22 pages.
Vinyals et al., "Pointer networks," CoRR, Submitted on Jun. 9, 2015, arXiv:1506.03134v1, 9 pages.
visualstudiomagazine.com [online], "Neural Network Train-Validate-Test Stopping," May 13, 2015, rctricvcd on Mar. 14, 2023, rctricvcd from URL<https://visualstudiomagazine.com/articles/2015/05/01/train-validate-test-stopping.aspx>, 15 pages.
Wierstra et al., [online], "Modeling systems with internal state using evolino," 2005, retrieved on Jun. 6, 2019, retrieved from URL <http://people.idsia.ch/~tino/papers/wierstra.gecco05.pdf>, 8 pages.
Williams, [onlinc], "Simple statistical gradicnt-following algorithms for conncctionist rcinforccmcnt learning," 1992, retrieved on Jun. 4, 2019, retrieved from <https://rd.springer.com/content/pdf/10.1007%2FBF00992696.pdf>, 28 pages.
Wu et al., "Google's neural machine translation system: Bridging the gap between human and machine translation," CoRR, Submitted on Oct. 8, 2016, arXiv:1609.08144v2, 23 pages.
Young et al., "Optimizing Deep Learning Hyper-Parameters Through an Evolutionary Algorithm," MLHPC2015, Nov. 15-20, 2015, pp. 1-5.
Zagoruyko et al., "Wide residual networks," CoRR, Submitted on Nov. 28, 2016, arXiv:1605.07146v2, 15 pages.
Zaremba et al., "Recurrent neural network regularization," CoRR, Submitted on Dec. 21, 2014, arXiv:1409.2329v4, 8 pages.
Zilly et al., "Recurrent highway networks," IBM Research, Oct. 2016, 13 pages.
Zoph et al., "Neural Architecture Search with Reinforcement Learning," International Conference on Lcarning Rcprcscntations, Feb. 2017, 16 pages.

* cited by examiner

NEURAL ARCHITECTURE SEARCH

CROSS-REFERENCE TO RELATED APPLICATIONS

This application is a continuation of U.S. application Ser. No. 17,340,959, filed on Jun. 7, 2021, which is a continuation of U.S. application Ser. No. 16/397,641, filed on Apr. 29, 2019, now U.S. Pat. No. 11,030,523, which is a continuation of International Application No. PCT/US2017/058760, filed on Oct. 27, 2017, which claims priority to U.S. Provisional Application No. 62/414,300, filed on Oct. 28, 2016. The disclosures of the prior applications are considered part of and are incorporated by reference in the disclosure of this application.

BACKGROUND

This specification relates to modifying neural network architectures.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step. An example of a recurrent neural network is a long short term (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

SUMMARY

This specification describes how a system implemented as computer programs on one or more computers in one or more locations can determine, using a controller neural network, an architecture for a child neural network that is configured to perform a particular neural network task.

Particular embodiments of the subject matter described in this specification can be implemented so as to realize one or more of the following advantages. The system can effectively and automatically, i.e., without user intervention, select a neural network architecture that will result in a high-performing neural network for a particular task. The system can effectively determine novel neural network architectures that are adapted for a particular task, allowing the resulting child neural network to have an improved performance on the task. Because the system determines the architecture by training a controller neural network through reinforcement learning, the system can effectively explore a large space of possible architectures to identify an architecture for the child neural network that is adapted for the particular task.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a system implemented as computer programs on one or more computers in one or more locations that determines, using a controller neural network, an architecture for a child neural network that is configured to perform a particular neural network task.

The child neural network can be configured to receive any kind of digital data input and to generate any kind of score, classification, or regression output based on the input.

For example, if the inputs to the child neural network are images or features that have been extracted from images, the output generated by the child neural network for a given image may be scores for each of a set of object categories, with each score representing an estimated likelihood that the image contains an image of an object belonging to the category.

As another example, if the inputs to the child neural network are Internet resources (e.g., web pages), documents, or portions of documents or features extracted from Internet resources, documents, or portions of documents, the output generated by the child neural network for a given Internet resource, document, or portion of a document may be a score for each of a set of topics, with each score representing an estimated likelihood that the Internet resource, document, or document portion is about the topic.

As another example, if the inputs to the child neural network are features of an impression context for a particular advertisement, the output generated by the child neural network may be a score that represents an estimated likelihood that the particular advertisement will be clicked on.

As another example, if the inputs to the child neural network are features of a personalized recommendation for a user, e.g., features characterizing the context for the recommendation, e.g., features characterizing previous actions taken by the user, the output generated by the child neural network may be a score for each of a set of content items, with each score representing an estimated likelihood that the user will respond favorably to being recommended the content item.

As another example, if the input to the child neural network is a sequence of text in one language, the output generated by the child neural network may be a score for each of a set of pieces of text in another language, with each score representing an estimated likelihood that the piece of text in the other language is a proper translation of the input text into the other language.

As another example, if the input to the child neural network is a sequence representing a spoken utterance, the output generated by the child neural network may be a score for each of a set of pieces of text, each score representing an estimated likelihood that the piece of text is the correct transcript for the utterance.

Figure 1:
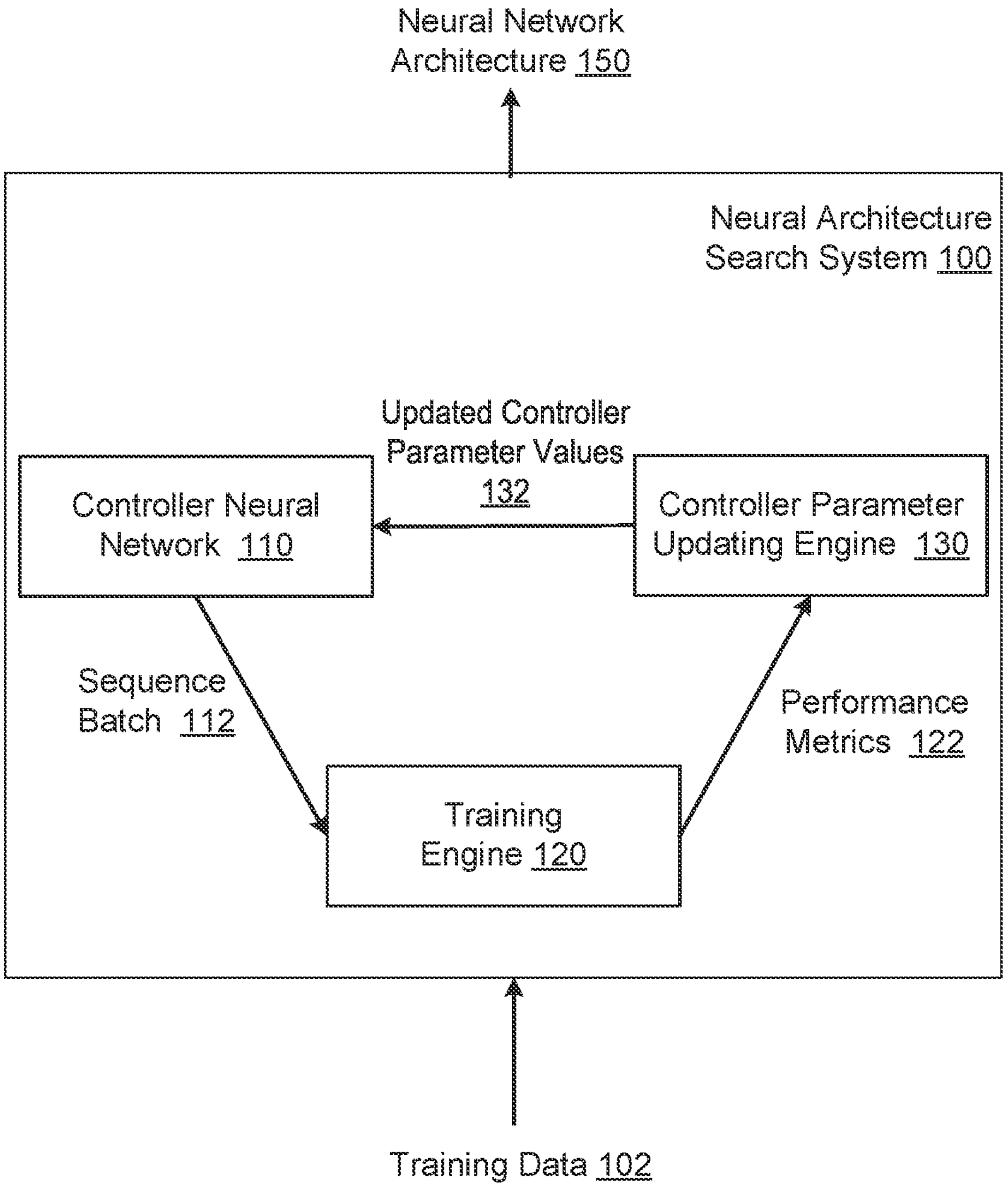
FIG. 1 shows an example neural architecture search system.

FIG. 1 shows an example neural architecture search system 100. The neural architecture search system 100 is an example of a system implemented as computer programs on one or more computers in one or more locations, in which the systems, components, and techniques described below can be implemented.

The neural architecture search system 100 is a system that obtains training data 102 for training a neural network to perform a particular task and a validation set 104 for evaluating the performance of the neural network on the particular task and uses the training data 102 and the validation set 104 to determine an architecture for a child neural network that is configured to perform the particular task. The architecture defines the number of layers in the child neural network, the operations performed by each of the layers, and the connectivity between the layers in the child neural network, i.e., which layers receive inputs from which other layers in the child neural network.

Generally, the training data 102 and the validation set 104 both include a set of neural network inputs and, for each network input, a respective target output that should be generated by the child neural network to perform the particular task. For example, a larger set of training data may have been randomly partitioned to generate the training data 102 and the validation set 104.

The system 100 can receive the training data 102 and the validation set 104 in any of a variety of ways. For example, the system 100 can receive training data as an upload from a remote user of the system over a data communication network, e.g., using an application programming interface (API) made available by the system 100, and randomly divide the uploaded data into the training data 102 and the validation set 104. As another example, the system 100 can receive an input from a user specifying which data that is already maintained by the system 100 should be used for training the neural network, and then divide the specified data into the training data 102 and the validation set 104.

The neural architecture search system 100 includes a controller neural network 110, a training engine 120, and a controller parameter updating engine 130.

The controller neural network 110 is a neural network that has parameters, referred to in this specification as "controller parameters," and that is configured to generate output sequences in accordance with the controller parameters. Each output sequence generated by the controller neural network 110 defines a respective possible architecture for the child neural network.

In particular, each output sequence includes a respective output at each of multiple time steps and each time step in the output sequence corresponds to a different hyperparameter of the architecture of the child neural network. Thus, each output sequence includes, at each time step, a respective value of the corresponding hyperparameter. Collectively, the values of the hyperparameters in a given output sequence define an architecture for the child neural network. Generally, a hyperparameter is a value that is set prior to the commencement of the training of the child neural network and that impacts the operations performed by the child neural network. Output sequences and possible hyperparameters are discussed in more detail below with reference to FIGS. 2A-2C.

Generally, the system 100 determines the architecture for the child neural network by training the controller neural network 110 to adjust the values of the controller parameters.

In particular, during an iteration of the training procedure, the system 100 generates a batch of sequences 112 using the controller neural network 110 in accordance with current values of the controller parameters. For each output sequence in the batch 112, the training engine 120 trains an instance of the child neural network that has the architecture defined by the output sequence on the training data 102 and evaluates the performance of the trained instance on the validation set 104. The controller parameter updating engine 130 then uses the results of the evaluations for the output sequences in the batch 112 to update the current values of the controller parameters to improve the expected performance of the architectures defined by the output sequences generated by the controller neural network 110 on the task. Evaluating the performance of trained instances and updating the current values of the controller parameters is described in more detail below with reference to FIG. 3.

By repeatedly updating the values of the controller parameters in this manner, the system 100 can train the controller neural network 110 to generate output sequences that result in child neural networks that have increased performance on the particular task, i.e., to maximize the expected accuracy on the validation set 104 of the architectures proposed by the controller neural network 110.

Once the controller neural network 110 has been trained, the system 100 can select the architecture that performed the best on the validation set 104 as the final architecture of the child neural network or can generate a new output sequence in accordance with the trained values of the controller parameters and use the architecture defined by the new output sequence as the final architecture of the child neural network.

The neural network search system 100 can then output architecture data 150 that specifies the architecture of the child neural network, i.e., data specifying the layers that are part of the child neural network, the connectivity between the layers, and the operations performed by the layers. For example, the neural network search system 100 can output the architecture data 150 to the user that submitted the training data. In some cases, the data 150 also includes trained values of the parameters of the child neural network from the training of the trained instance of the child neural network that had the architecture.

In some implementations, instead of or in addition to outputting the architecture data 150, the system 100 trains an instance of the neural network having the determined architecture, e.g., either from scratch or to fine-tune the parameter values generated as a result of training the instance of the child neural network having the architecture, and then uses the trained neural network to process requests received by users, e.g., through the API provided by the system. That is, the system 100 can receive inputs to be processed, use the trained child neural network to process the inputs, and provide the outputs generated by the trained neural network or data derived from the generated outputs in response to the received inputs.

In some implementations, the system 100 trains the controller neural network in a distributed manner. That is, the system 100 includes multiple replicas of the controller neural network. In some of these implementations where the training is distributed, each replica has a dedicated training engine that generates performance metrics for batches of output sequences output by the replica and a dedicated controller parameter update engine that determines updates to the controller parameters using the performance metrics. Once the controller parameter update engine has determined an update, the controller parameter update engine can transmit the update to a central parameter updating server that is accessible to all of the controller parameter updates engines. The central parameter updating server can update the values of the controller parameters that are maintained by the server and send the updated values to the controller parameter update engine. In some cases, each of the multiple replicas and their corresponding training engines and parameter updating engines can operate asynchronously from each other set of training engines and parameter updating engines.

Figure 2A:
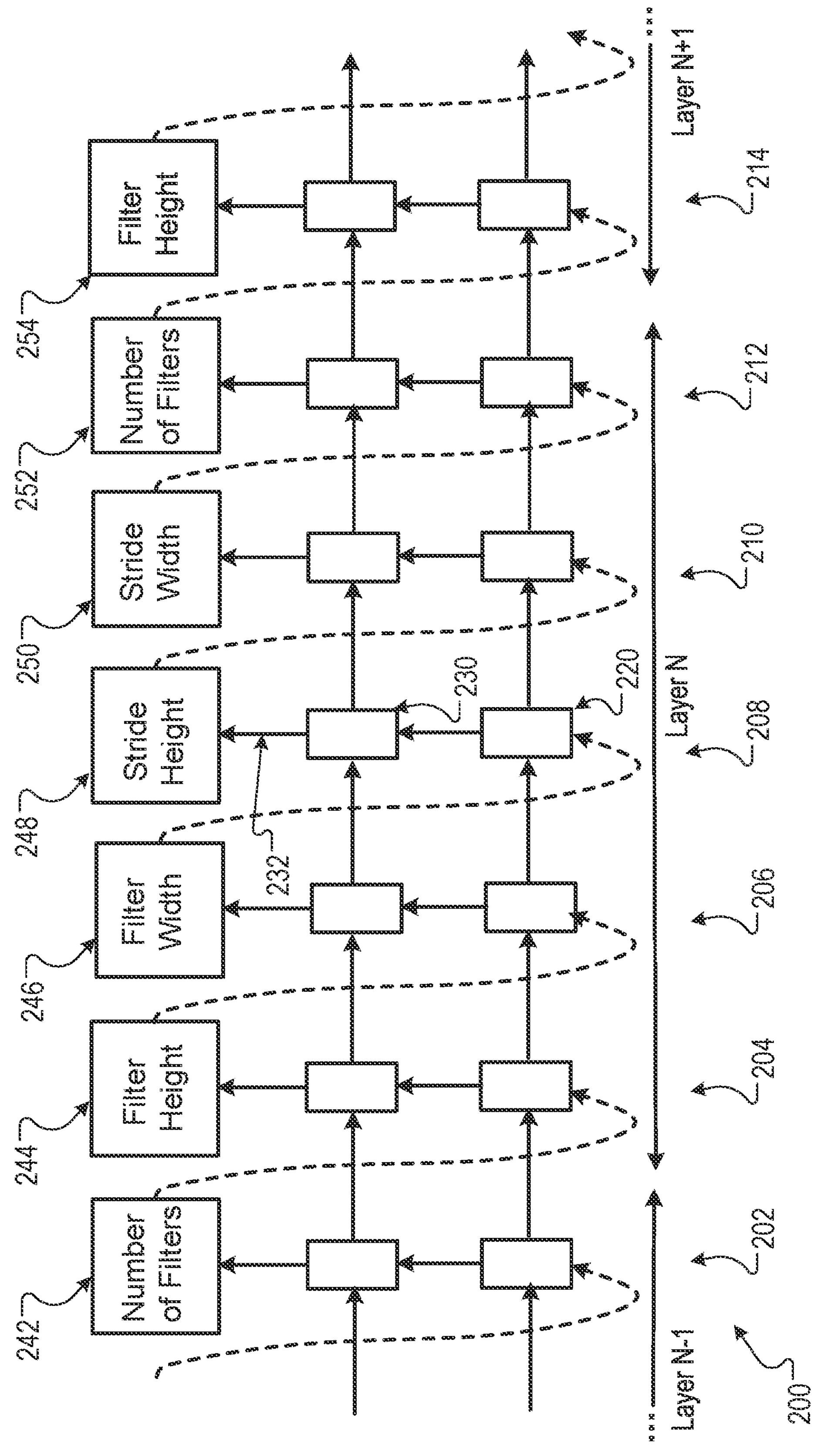
FIG. 2A is a diagram of an example of the controller neural network generating an output sequence.

FIG. 2A is a diagram 200 of an example of the controller neural network 110 generating an output sequence.

In particular, the diagram 200 depicts the processing performed by the controller neural network 110 for seven example time steps 202-214 during the generation of an output sequence. As will be described in more detail below, each of the seven time steps 202-214 corresponds to a different hyperparameter of the neural network architecture.

The controller neural network 110 is a recurrent neural network that includes one or more recurrent neural network layers, e.g., layers 220 and 230, that are configured to, for each time step, receive as input the value of the hyperparameter corresponding to the preceding time step in the given output sequence and to process the input to update a current hidden state of the recurrent neural network. For example, the recurrent layers in the controller neural network 110 can be long-short term memory (LSTM) layers or gated recurrent unit (GRU) layers. In the example of FIG. 2A, at time step 208, the layers 220 and 230 receive as input the value of the hyperparameter from the preceding time step 206 and update the hidden states of the layers 220 and 230 from time step 206 to generate as output an updated hidden state 232.

The controller neural network 110 also includes a respective output layer for each time step in the output sequence, e.g., output layers 242-254 for time steps 202-214, respectively. Each of the output layers is configured to receive an output layer input that includes the updated hidden state at the time step and to generate an output for the time step that defines a score distribution over possible values of the hyperparameter at the time step. For example, each output layer can first project the output layer input into the appropriate dimensionality for the number of possible values for the corresponding hyperparameter and then apply a softmax to the projected output layer input to generate a respective score for each of multiple possible values for the hyperparameter at the time step. For example, the output layer 248 for time step 208 is configured to receive an input that includes the hidden state 232 and to generate a respective score for each of multiple possible values for the stride height hyperparameter.

Thus, to generate a hyperparameter value for a given time step in an output sequence, the system 100 provides as input to the controller neural network the value of the hyperparameter at the preceding time step in the output sequence and the controller neural network generates an output for the time step that defines a score distribution over possible values of the hyperparameter at the time step. For the very first time step in the output sequence, because there is no preceding time step, the system 100 can instead provide a pre-determined placeholder input. The system 100 then samples from the possible values in accordance with the score distribution to determine the value of the hyperparameter at the time step in the output sequence. The possible values that a given hyperparameter can take are fixed prior to training and the number of possible values can be different for different hyperparameters.

Generally, the number of layers to be included in the architecture defined by a given output sequence is fixed prior to generating the sequence. In some implementations, each architecture defined by output sequences generated during the training of the controller neural network has the same number of layers. In other implementations, the system uses a schedule of increasing the number of layers in the child neural networks as training progresses. As one example, the system can increase the depth by one or more layers every 1,600 samples during the training, starting at 6 layers.

In the example of FIG. 2A, the child neural network is a convolutional neural network and the hyperparameters include hyperparameters for each convolutional neural network layer in the child neural network. In particular, in FIG. 2A, time step 202 corresponds to a hyperparameter of convolutional layer N−1 of the child neural network, time steps 204-212 correspond to hyperparameters of convolutional layer N, and time step 214 corresponds to a hyperparameter of convolutional layer N+1. For example, the convolutional layers may be arranged in a stack, with layer N receiving as input the output generated by layer N−1 and generating an output that is provided as input to layer N+1.

In the example of FIG. 2A, for a convolutional layer, the hyperparameters that define the operations performed by the layer are the number of filters of the layer, the filter height for each filter, the filter width for each filter, the stride height for applying each filter, and the stride width for each filter. In other examples, some of these can be removed, e.g., certain ones of these hyperparameters can be assumed to be fixed, other hyperparameters, e.g., type of activation function, whether or not the convolutions are dilated or masked, and so on, can be added, or both.

In one example implementation, the possible values for the filter height are [1, 3, 5, 7], the possible values for the filter width are [1, 3, 5, 7], the possible values for the number of filters are [24, 36, 48, 6 64], and the possible values for the stride height and width are [1, 2, 3].

In the example of FIG. 2A, the configuration of the layers in the child neural network, i.e., which layers receive layers from which other layers, is fixed. In other examples, however, the hyperameters include hyperparameters defining the connectivity between the layers in the child neural network.

Figure 2B:
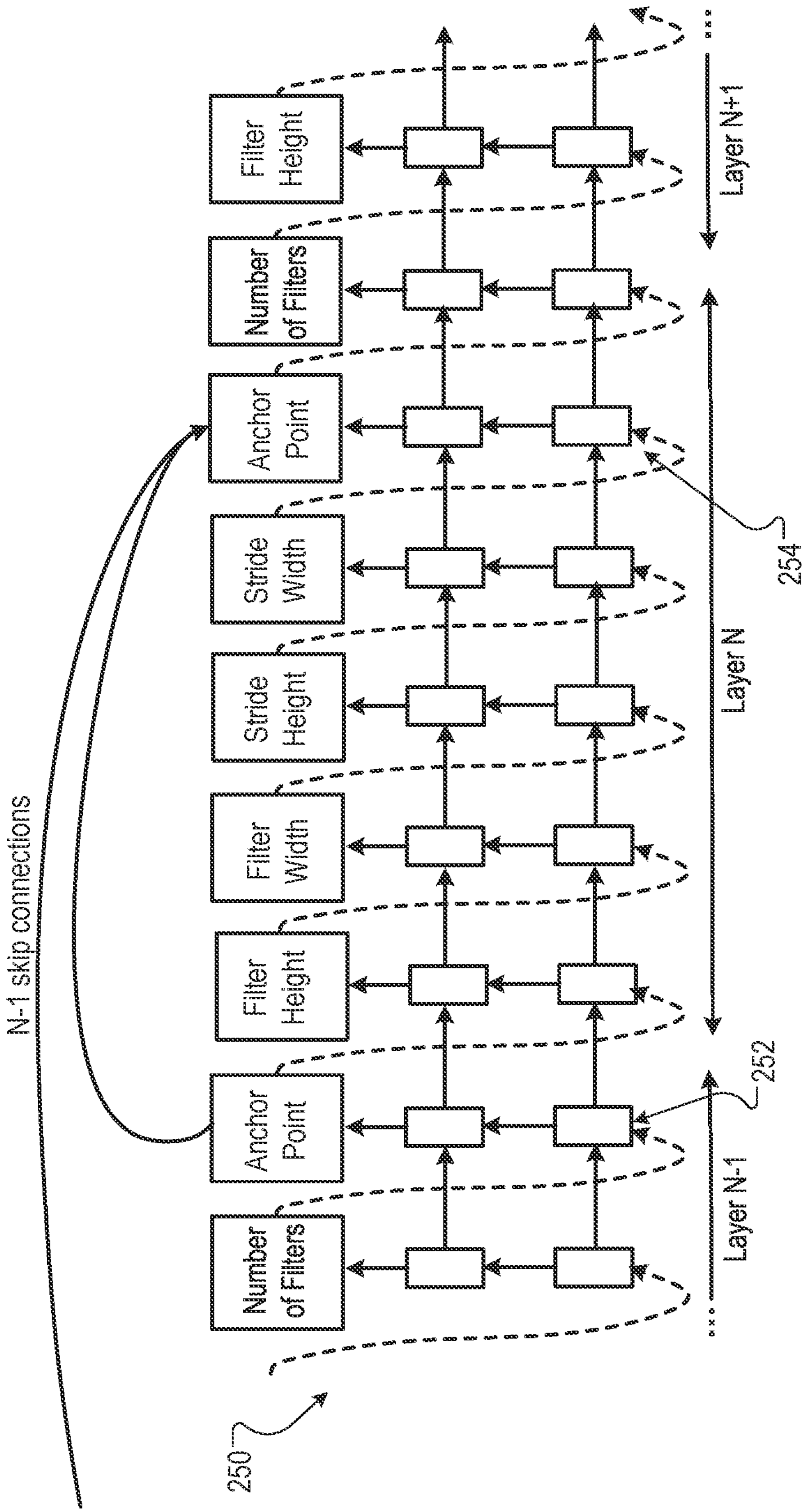
FIG. 2B is a diagram of an example of the controller neural network generating an output sequence that defines an architecture that includes skip connections.

FIG. 2B is a diagram 250 of an example of the controller neural network 110 generating an output sequence that defines an architecture that includes skip connections.

In particular, in the example of FIG. 2B, for one or more of the layers in the child neural network, the hyperparameters include a skip connection hyperparameter that defines which earlier layers have a skip connection to the layer. More specifically, the time steps in the output sequence include a respective anchor point time step for each of the one or more layers at which the hypermeter is a skip connection hyperparameter, e.g., time step 252 for layer N−1 and time step 254 for layer N.

The output layer for a given anchor point time step for a given layer includes a respective node corresponding to each layer earlier than the current layer in the child neural network. Each of the nodes is configured to process (i) the updated hidden state for the anchor point step and (ii) the updated hidden state for the anchor point time step for the corresponding earlier layer, i.e., the earlier layer corresponding to the node, in accordance with a set of parameters to generate a score that represents a likelihood that the corresponding earlier layer is connected to the current layer in the child neural network. For example, the node in the output layer of a layer i that corresponds to an earlier layer j can generate a score for the corresponding earlier layer that satisfies:

$$P(\text{Layer } j \text{ is an input to layer } i)=\text{sigmoid}(v^T \tanh(W_{prev}*+W_{curr}*h_i),$$

where $v^T$, $W_{prev}$, and $W_{curr}$ are parameters for the node, $h_j$ is the updated hidden state for the anchor point time step for the corresponding earlier layer j, and $h_i$ is the updated hidden state for the anchor point time step for the layer i.

The system 100 then determines, for each earlier layer, whether the layer is connected to the given layer with a skip connection by sampling either yes or no in accordance with the score generated by the node corresponding to the earlier layer. If the system determines that multiple layers should be connected to the given layer, the outputs generated by all of the multiple layers are concatenated in the depth dimension to generate the input to the given layer. To ensure that skip connections do not cause "compilation failures" where one layer is not compatible with another layer and that the network that does not include any layers that do not have any input or output, (i) if a layer is not connected to any input layer then the network input is used as the input to the layer, (ii) at the final layer, the system takes all layer outputs that have not been connected and concatenates them before sending the final concatenated output to the output layer of the network, and (iii) if inputs to be concatenated have different sizes, the system pads the small layers with zeros so that the inputs to be concatenated have the same sizes.

In some examples, the child neural network includes multiple different layer types. For example, the child neural network can be a convolutional neural network that also includes other kinds of neural network layers, e.g., fully-connected layers, pooling layers, depth concatenation layers, local contrast normalization, batch normalization, an output layer, e.g., a softmax layer or other classifier layer, and so on.

In some of these examples, the positions and hyperparameters of these other layers are fixed and the output sequences only include hyperparameter values for the convolutional neural network layers in the child neural network. For example, the position of the output layer may be fixed as the last layer in the child neural network and some or all of the convolutional layers may be followed or preceded by batch normalization layers.

In others of these examples, the hyperparameters defined by the output sequences include, for each layer, a value corresponding to the type of the layer. Because different types of layers have different hyperparameters, in these examples, the system determines which hyperparameters correspond to which time steps dynamically during generation of an output sequence based on which type of neural network layer is selected for a given layer. That is, the output layer used by the system as the output layer for a given time step depends on the value of the most-recently sampled layer type hyperparameter.

In some examples, the child neural network is a recurrent neural network. In these cases, the output sequence can define an architecture of a recurrent cell, and the recurrent cell can be repeated multiple times within the child neural network to generate the architecture for the neural network. As described above, in some cases the number of repetitions is fixed throughout training, while in other cases the system increases the number of repetitions as training progresses.

Figure 2C:
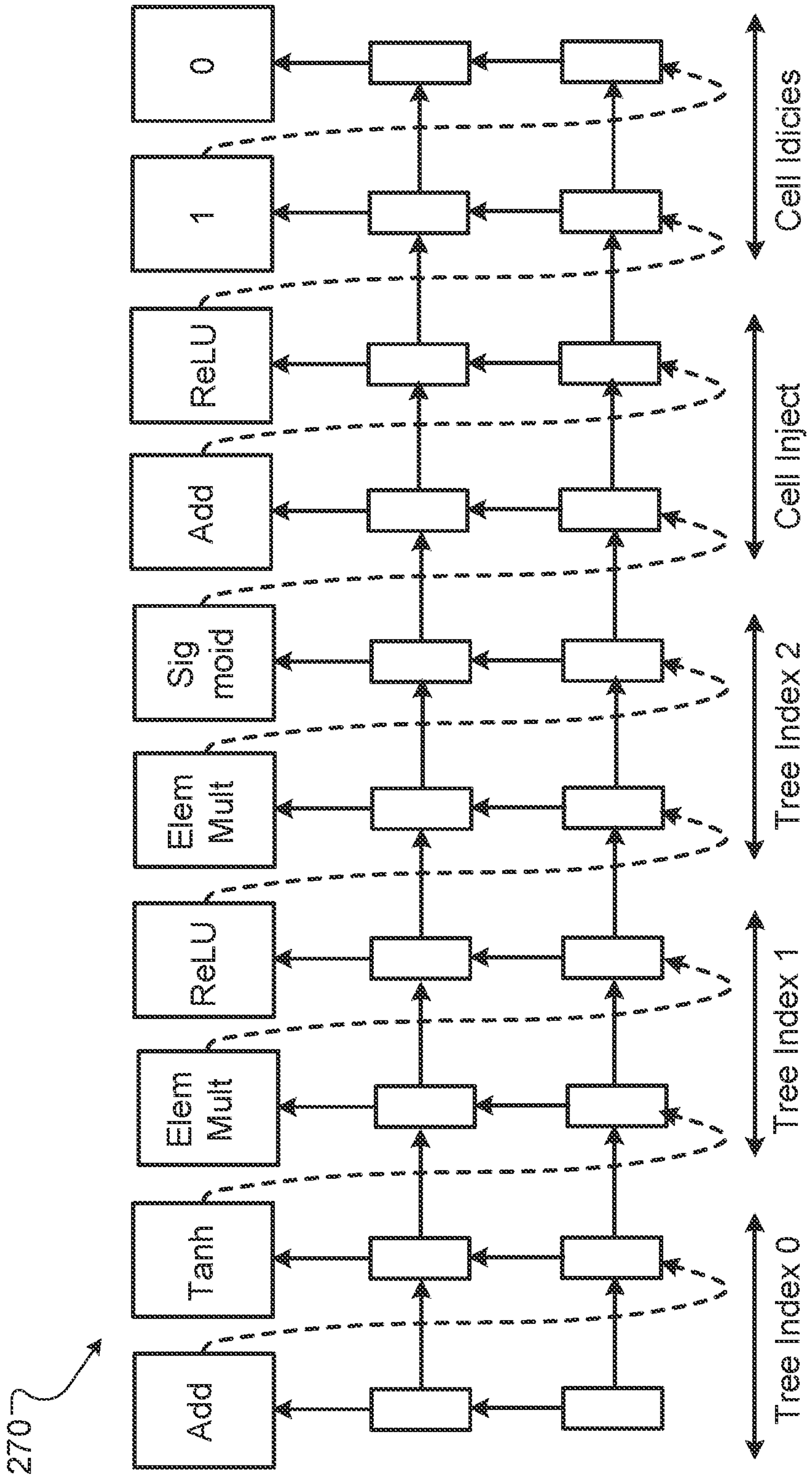
FIG. 2C is a diagram of an example of the controller neural network generating an output sequence that defines an architecture for a recurrent cell.

FIG. 2C is a diagram 270 of an example of the controller neural network 110 generating an output sequence that defines an architecture for a recurrent cell.

In particular, in the example of FIG. 2C, the output sequence includes a respective computation step for each node in a tree of computation steps that represents the computations performed by the recurrent cell. The recurrent cell receives two inputs: the output of the cell from the previous time step and an input for the current time step, i.e., the input to the child network at the time step or an output generated by another component of the child network. The recurrent cell processes those two inputs to generate a cell output. As will be described below, in some cases the recurrent cell also receives a third input: a memory state.

More specifically, in the example of FIG. 2C, the output sequence defines settings for three nodes of the tree: one leaf node at tree index 0, another leaf node at tree index 1, and an internal node at tree index 2.

Each node in the tree merges two inputs to generate an output, and, for each node, the output sequence includes: (i) data identifying a combination method to combine the two inputs and (ii) an activation function to be applied to the combination of the two inputs to generate the output. Generally, leaf nodes in the cell first apply a respective parameter matrix to each of the two inputs to the cell while internal nodes do not have any parameters. As described above, the combination method is selected from a set of possible combination methods, e.g., [add; element wise multiply], and the activation functions is selected from a set of possible activation functions, e.g., [identity; tanh; sigmoid; relu].

For example, for the leaf node at tree index 0, because the system selected "add" as the combining function and "tanh" as the activation function, the leaf node at tree index 0 of the cell may perform the following operations to generate an output $a_0$:

$$a_0=\tanh(W_1*x_t+W_2*h_{t-1}),$$

where $W_1$ and $W_2$ are parameter matrices of the node, $x_t$ is the input to the cell at the time step, and $h_{t-1}$ is the output of the cell from the previous time step.

For the node at tree index 2, when the cell has no memory state, the example of FIG. 2C specifies that the two inputs to the node, i.e., the outputs of the two leaf nodes, are to be element-wise multiplied and that an element-wise sigmoid function is to be applied to the output of the element-wise multiplication to generate the output of the internal node, i.e., the output of the cell.

Optionally, the architecture of the cell may also include receiving a preceding memory state as input. In these cases, the output sequence also includes values that define how the memory state of the cell is injected into the cell, i.e., how the preceding memory state is updated and which nodes have outputs that are modified using the preceding memory state before being passed to the next node in the tree.

In particular, the output sequence also includes two cell inject values that specify how the preceding memory state is combined with an output of one of the nodes in the tree to generate an updated output for the node, i.e., the combination method and the activation function for the combination, and two cell indices values that specify (i) the node whose output is updated using the memory state and (ii) the node whose output is set to be the updated memory state (before application of the activation function for the node).

In the example of FIG. 2C, because the value generated for the second cell index is 0, the combination method for the injection is add, and the activation function is ReLU, the cell can add the preceding cell state and the output of the node at tree index 0 (referred to as $a_0$ above) and then apply the ReLU to the sum to generate an updated output of the node at tree index 0. The cell can then provide the updated output as input to the node at tree index 2.

Because the value generated for the first cell index is 1, the cell sets the updated memory state to the output of the tree at index 1 before the activation function is applied.

While FIG. 2C depicts an example where the tree includes two leaf nodes for ease of exposition, in practice the number of leaf nodes may be larger, e.g., four, eight, or sixteen.

Figure 3:
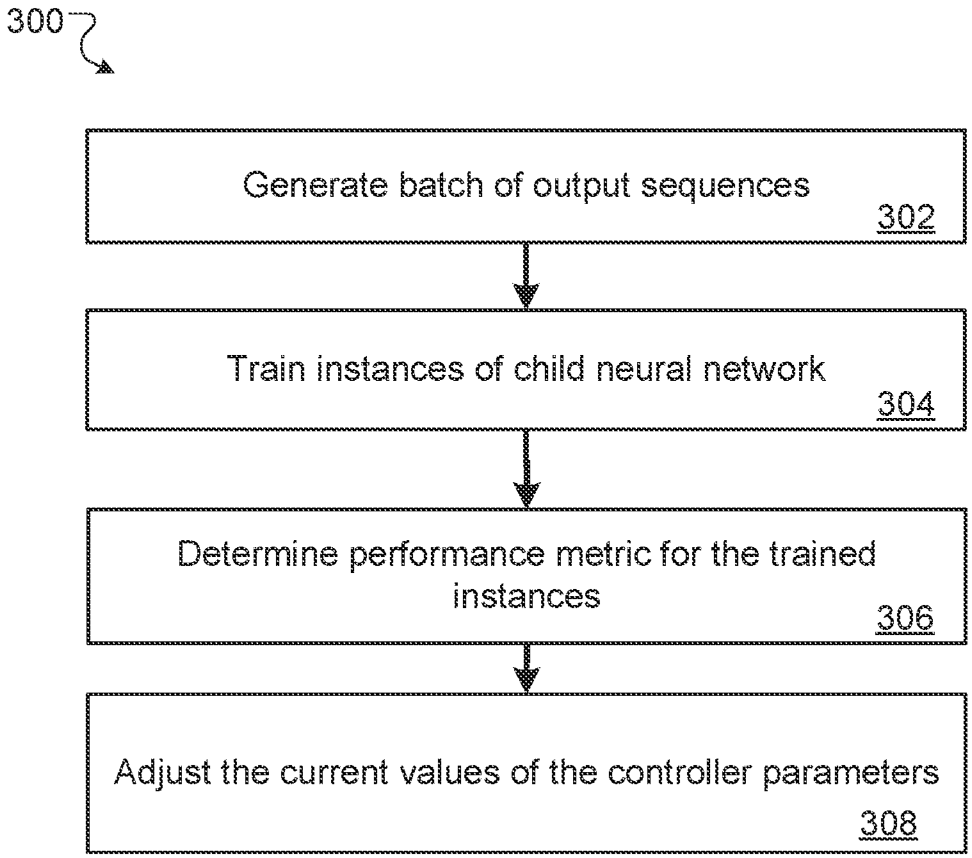
FIG. 3 is a flow diagram of an example process for updating current values of the controller parameters.

FIG. 3 is a flow diagram of an example process 300 for updating current values of the controller parameters. For convenience, the process 300 will be described as being performed by a system of one or more computers located in one or more locations. For example, a neural architecture search system, e.g., the neural architecture search system 100 of FIG. 1, appropriately programmed, can perform the process 300.

The system can repeatedly perform the process 300 to train the controller neural network, i.e., to determine trained values of the controller parameters from initial values of the controller parameters.

The system generates a batch of output sequences using the controller neural network and in accordance with current values of the controller parameters as of the iteration (step 302). Each output sequence in the batch defines a respective architecture of the child neural network. In particular, because, as described above, the system samples from a score distribution when generating each hyperparameter value in an output sequence, the sequences in the batch will generally be different even though they are each generated in accordance with the same controller parameter values. The batch generally includes a pre-determined number of output sequences, e.g., eight, sixteen, thirty-two, or sixty-four sequences.

For each output sequence in the batch, the system trains an instance of the child neural network having the architecture defined by the output sequence to perform the particular neural network task (step 304). That is, for each output sequence in the batch, the system instantiates a neural network having the architecture defined by the output sequence and trains the instance on the received training data to perform the particular neural network task using a conventional machine learning training technique that is appropriate for the task, e.g., stochastic gradient descent with backpropagation or backpropagation-through-time. In some implementations, the system parallelizes the training of the child neural networks to decrease the overall training time for the controller neural network. The system can train each child neural network for a specified amount of time or a specified number of training iterations.

For each output sequence in the batch, the system evaluates the performance of the corresponding trained instance of the child neural network on the particular neural network task to determine a performance metric for the trained instance on the particular neural network task (step 306). For example, the performance metric can be an accuracy of the trained instance on the validation set as measured by an appropriate accuracy measure. For example, the accuracy can be a perplexity measure when the outputs are sequences or a classification error rate when the task is a classification task. As another example, the performance metric can be an average or a maximum of the accuracies of the instance the instance for each of the last two, five, or ten epochs of the training of the instance.

The system uses the performance metrics for the trained instances to adjust the current values of the controller parameters (step 308).

In particular, the system adjusts the current values by training the controller neural network to generate output sequences that result in child neural networks having increased performance metrics using a reinforcement learning technique. More specifically, the system trains the controller neural network to generate output sequences that maximize a received reward that is determined based on the performance metrics of the trained instances. In particular, the reward for a given output sequence is a function of the performance metric for the trained instance. For example, the reward can be one of: the performance metric, the square of the performance metric, the cube of the performance metric, the square root of the performance metric, and so on.

In some cases, the system trains the controller neural network to maximize the expected reward using a policy gradient technique. For example, the policy gradient technique can be a REINFORCE technique or a Proximal Policy Optimization (PPO) technique. For example, the system can estimate the gradient of the expected reward with respect to the controller parameters using an estimator of the gradient that satisfies:

$$\frac{1}{m}\sum_{k=1}^{m}\sum_{t=1}^{T}\nabla_{\theta_c}\log|P(a_t|a_{(t-1):1};\theta_c)(R_k-b),$$

where m is the number of sequences in the batch, T is the number of time steps in each sequence in the batch, $a_t$ is the output at time step t in a given output sequence, $R_k$ is the reward for output sequence k, $\theta_c$ are the controller parameters, and b is a baseline function, e.g., the exponential moving average of previous architecture accuracies.

In some implementations, the system trains the controller neural network in a distributed manner. That is, the system maintains multiple replicas of the controller neural network and updates the parameters values of the replicas asynchronously during the training. That is, the system can perform the steps 302-306 asynchronously for each replica and can update the controller parameters using the gradients determined for each of the replicas.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, comprising:

determining, using a controller, a plurality of respective architectures of a child neural network that is configured to perform a particular neural network task;

for each respective architecture in the plurality of respective architectures:

training an instance of the child neural network having the respective architecture on training data that includes a plurality of training inputs each associated with a respective target training output to perform the particular neural network task; and after the training, determining, based on evaluating a performance of the trained instance of the child neural network using validation data that includes one or more different training inputs than the training data, a performance metric for the trained instance of the child neural network on the particular neural network task; and using the performance metrics for the trained instances of the child neural network to adjust the controller.

2. The method of claim 1, wherein:

the controller is implemented using a controller neural network having a plurality of controller parameters.

3. The method of claim 2, wherein using the performance metrics for the trained instances of the child neural network to adjust the controller comprises:

training the controller neural network to generate output sequences that result in child neural networks having increased performance metrics using a reinforcement learning technique.

4. The method of claim 3, wherein the reinforcement learning technique is a policy gradient technique.

5. The method of claim 3, wherein the reinforcement learning technique is a REINFORCE technique.

6. The method of claim 1, further comprising:

generating, using the adjusted controller, a final architecture of the child neural network.

7. The method of claim 6, further comprising:

using an instance of the child neural network having the final architecture to process new input data.

8. The method of claim 3, wherein training the controller neural network comprises training the controller neural network in a distributed manner including adjusting current values of respective controller parameters of multiple replicas of the controller neural network.

9. A system comprising one or more computers and one or more storage devices storing instructions that when executed by the one or more computers cause the one or more computers to perform operations comprising:

determining, using a controller, a plurality of respective architectures of a child neural network that is configured to perform a particular neural network task;

for each respective architecture in the plurality of respective architectures:

training an instance of the child neural network having the respective architecture on training data that includes a plurality of training inputs each associated with a respective target training output to perform the particular neural network task; and after the training, determining, based on evaluating a performance of the trained instance of the child neural network using validation data that includes one or more different training inputs than the training data, a performance metric for the trained instance of the child neural network on the particular neural network task; and using the performance metrics for the trained instances of the child neural network to adjust the controller.

10. The system of claim 9, wherein:

the controller is implemented using a controller neural network having a plurality of controller parameters.

11. The system of claim 10, wherein using the performance metrics for the trained instances of the child neural network to adjust the controller comprises:

training the controller neural network to generate output sequences that result in child neural networks having increased performance metrics using a reinforcement learning technique.

12. The system of claim 11, wherein the reinforcement learning technique is a policy gradient technique.

13. The system of claim 11, wherein the reinforcement learning technique is a REINFORCE technique.

14. The system of claim 9, wherein in the operations further comprise:

generating, using the adjusted controller, a final architecture of the child neural network.

15. The system of claim 14, wherein in the operations further comprise:

using an instance of the child neural network having the final architecture to process new input data.

16. The system of claim 11, wherein training the controller neural network comprises training the controller neural network in a distributed manner including adjusting current values of respective controller parameters of multiple replicas of the controller neural network.

17. One or more non-transitory computer storage media storing instructions that when executed by one or more computers cause the one or more computers to perform operations comprising:

determining, using a controller, a plurality of respective architectures of a child neural network that is configured to perform a particular neural network task;

for each respective architecture in the plurality of respective architectures:

training an instance of the child neural network having the respective architecture on training data that includes a plurality of training inputs each associated with a respective target training output to perform the particular neural network task; and after the training, determining, based on evaluating a performance of the trained instance of the child neural network using validation data that includes one or more different training inputs than the training data, a performance metric for the trained instance of the child neural network on the particular neural network task; and using the performance metrics for the trained instances of the child neural network to adjust the controller.

18. The non-transitory computer storage media of claim 17, wherein:

the controller is implemented using a controller neural network having a plurality of controller parameters.

19. The non-transitory computer storage media of claim 18, wherein using the performance metrics for the trained instances of the child neural network to adjust the controller comprises:

training the controller neural network to generate output sequences that result in child neural networks having increased performance metrics using a reinforcement learning technique.

20. The non-transitory computer storage media of claim 19, wherein training the controller neural network comprises training the controller neural network in a distributed manner including adjusting current values of respective controller parameters of multiple replicas of the controller neural network.

* * * * *